United States Patent
Balzer et al.

(10) Patent No.: US 10,838,575 B2
(45) Date of Patent: Nov. 17, 2020

(54) ADAPTIVE TILE-BASED USER INTERFACE FOR INFERRING USER INTEREST

(71) Applicant: Microsoft Technology Licensing, LLC, Redmond, WA (US)

(72) Inventors: Andreas Balzer, Dublin (IE); Alan Noel Mulhall, Dublin (IE); Muiris Woulfe, Dublin (IE); David Mowatt, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 189 days.

(21) Appl. No.: 15/624,683

(22) Filed: Jun. 15, 2017

(65) Prior Publication Data

US 2018/0364888 A1 Dec. 20, 2018

(51) Int. Cl.
*G06F 3/0481* (2013.01)
*G06Q 30/02* (2012.01)
*G06F 16/9535* (2019.01)

(52) U.S. Cl.
CPC ...... *G06F 3/04817* (2013.01); *G06F 16/9535* (2019.01); *G06Q 30/0255* (2013.01)

(58) Field of Classification Search
CPC ............ G06F 3/04817; G06F 16/9535; G06Q 30/0255
See application file for complete search history.

(56) References Cited

U.S. PATENT DOCUMENTS

| | | | | |
|---|---|---|---|---|
| 6,671,424 B1* | 12/2003 | Skoll | ........................ | G06T 1/60 382/305 |
| 8,866,815 B2* | 10/2014 | Helfman | ............... | G06T 11/206 345/440 |
| 8,910,084 B2* | 12/2014 | Helfman | ............... | G06T 11/206 715/854 |
| 8,997,151 B2 | 3/2015 | Chai et al. | | |
| 9,372,592 B1* | 6/2016 | Goodspeed | ........... | G06F 3/0481 |
| 2004/0169654 A1* | 9/2004 | Walker | .................. | G06T 11/206 345/440 |
| 2005/0289482 A1 | 12/2005 | Anthony et al. | | |
| 2007/0233726 A1* | 10/2007 | Torrens | ................ | G11B 27/105 |
| 2008/0092054 A1 | 4/2008 | Bhumkar et al. | | |

(Continued)

OTHER PUBLICATIONS

"Laurab Net", http://www.laurab.net/, Retrieved on: Nov. 17, 2016, 1 page.

(Continued)

*Primary Examiner* — Mandrita Brahmachari

(57) ABSTRACT

The description relates to determining tiles of interest to a user. One example includes a computing device comprising a display, a user input receiving means, and a processing means. The processing means is configured to render on the display a first plurality of tiles each having a respective value of a first classification. The processing means is configured to receive from the user input receiving means a first user input indicating user interest in a first tile of the first plurality of tiles, the first tile having a first value of the first classification. The processing means is configured, in response to receiving the first user input, to render on the display a second plurality of tiles each having a respective value of a second classification and being related to the first tile by having a value of the first classification within a threshold similarity of the first value.

20 Claims, 14 Drawing Sheets

(56) References Cited

U.S. PATENT DOCUMENTS

| | | | | |
|---|---|---|---|---|
| 2008/0306840 | A1* | 12/2008 | Houlihan | G06Q 10/087 705/28 |
| 2009/0240676 | A1* | 9/2009 | Gruen | G06F 16/9535 |
| 2010/0274849 | A1* | 10/2010 | Sighart | G06F 16/3326 709/203 |
| 2010/0281402 | A1* | 11/2010 | Staikos | G06F 16/957 715/760 |
| 2010/0293056 | A1* | 11/2010 | Flynt | G06F 3/0481 705/14.58 |
| 2011/0099468 | A1* | 4/2011 | Gaskill | G06F 3/0483 715/240 |
| 2012/0158728 | A1* | 6/2012 | Kumar | G06F 16/954 707/737 |
| 2013/0080371 | A1* | 3/2013 | Harber | G06F 16/686 706/50 |
| 2013/0080968 | A1* | 3/2013 | Hanson | G06F 3/0482 715/783 |
| 2013/0152129 | A1* | 6/2013 | Alberth | H04N 21/4312 725/41 |
| 2014/0222819 | A1* | 8/2014 | Dies | G06F 16/951 707/740 |
| 2014/0365890 | A1* | 12/2014 | Lei | H04N 21/4143 715/719 |
| 2015/0062182 | A1* | 3/2015 | Dow | G06T 3/40 345/660 |
| 2015/0242110 | A1* | 8/2015 | Balakrishnan | G06F 16/54 715/830 |
| 2015/0378526 | A1* | 12/2015 | Ramanathan | G06F 16/248 715/841 |
| 2016/0070457 | A1* | 3/2016 | Furtwangler | G06F 3/04847 715/763 |
| 2016/0260241 | A1* | 9/2016 | Jin | G06T 15/005 |
| 2017/0195734 | A1* | 7/2017 | Park | G06F 3/04883 |

OTHER PUBLICATIONS

"Stack Exchange: User Experience", http://ux.stackexchange.com/questions/9010/vertical-horizontal-scrollable-u, Retrieved on: Nov. 17, 2016, 2 pages.

Cao, Jerry, "How cards are taking over Web design", http://thenextweb.com/dd/2015/06/16/how-cards-are-taking-over-web-design/, Published on: Jun. 16, 2015, 19 pages.

Whitesell, Ben, "Creative blog", http://www.creativebloq.com/web-design/user-interface-design-2131842, Published on: Jan. 23, 2015, 10 pages.

"Introducing Daydream View, VR Headset by Google", https://www.youtube.com/watch?v=rLLAA4ENIP4&feature=youtu.be, Published on: Oct. 4, 2016, 4 pages.

"Rocket-cool Webflow Grid-Style infinite scroll product website", http://grid-style-infinite-scrolling-example.webflow.io/, Retrieved on: Nov. 17, 2016, 7 pages.

* cited by examiner

ADAPTIVE TILE-BASED USER INTERFACE FOR INFERRING USER INTEREST

BACKGROUND

The accessibility of information, products and services has been revolutionized by the Internet, with users being able to search for and access information and products with unparalleled convenience.

Typically, digital experiences such as online stores, image search applications and warehouse databases may present physical or digital products such as software applications (apps), images or products in a list or grid. This is generally presented together with searching functionality. For example, a user might be able to enter a search term into a search field to obtain results of interest. Such experiences also often present the user with filtering options, for example to restrict search results to within a user-selected price range.

Other websites that present information, such as online encyclopedias, museum websites, online libraries, and so on, typically require the user to manually input search terms and/or apply filters.

However, these techniques require the user to know in advance what to search for or what filters to apply. The search terms and filters also typically need to be entered manually, for example by tap input on a touchscreen keyboard, which can be tedious and time-consuming.

This approach fails to fully exploit the opportunities available on interactive platforms, large screen displays or virtual reality environments. In particular, the tedious nature of inputting search parameters and applying filters, combined with the need for the user to know what search parameters and filters to apply in advance, places a burden on the user because the system is not inherently clever to identify what the user is likely to be looking for.

The embodiments described below are not limited to implementations which solve any or all of the disadvantages of these known techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

The description relates to determining tiles of interest to a user. One example includes a computing device comprising a display; a user input receiving means, and a processing means. The processing means is configured to render on the display a first plurality of tiles each having a respective value of a first classification. The processing means is configured to receive from the user input receiving means a first user input indicating user interest in a first tile of the first plurality of tiles, the first tile having a first value of the first classification. The processing means is configured, in response to receiving the first user input, to render on the display a second plurality of tiles each having a respective value of a second classification and being related to the first tile by having a value of the first classification within a threshold similarity of the first value.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The present disclosure presents a computing device, method and means for determining tiles of interest to a user. The tiles are graphical representations and may, for example, represent deliverables available for purchase, such as products for purchase, which may include digital products such as apps or physical products. Alternatively, the tiles may represent information or collections of information, for example on a library website, online encyclopaedia, or museum or art gallery website. In general, the tiles may be any shape or format of a graphical representation of information that may be of interest to a user. They may be two dimensional or three dimensional, and may for example be rendered in a virtual reality or augmented reality environment. The tiles may comprise a static image or may comprise a video, and may load data asynchronously and change what they display, for example a tile may display a news ticker of a first news broadcaster while another displays a news ticker of a second news broadcaster.

Typically, in order to find a tile a user must input search terms and/or apply filters to obtain results of interest. The inventors have appreciated that a more user-friendly approach is possible that makes use of an interactive virtual environment in which users can explore tiles that may be of interest. In particular, the inventors have appreciated that user inputs related to user browsing behaviour can be used to determine what the user may be looking for, and to present tiles selected on the basis of this browsing behaviour. This process can be repeated in order to determine further subsets of interest within the presented tiles, thereby drilling down to a combination of features that the user appears to be interested in.

As each subset of interest is inferred, tiles belonging to the latest subset are displayed. The present disclosure therefore presents a user interface that is adaptive by virtue of displaying new subgroups of tiles based on user browsing behaviour. The term 'adaptive' therefore describes the ability of the user interface to change in response to user browsing behaviour.

For example, this approach can be used to assist a user in browsing clothing in an online store. The technique of using the user's browsing behaviour to determine tiles that should be presented to drill down further to discover what the user may be interested in can be used to help the user efficiently and effectively find clothing items that they want to buy.

Figure 1:
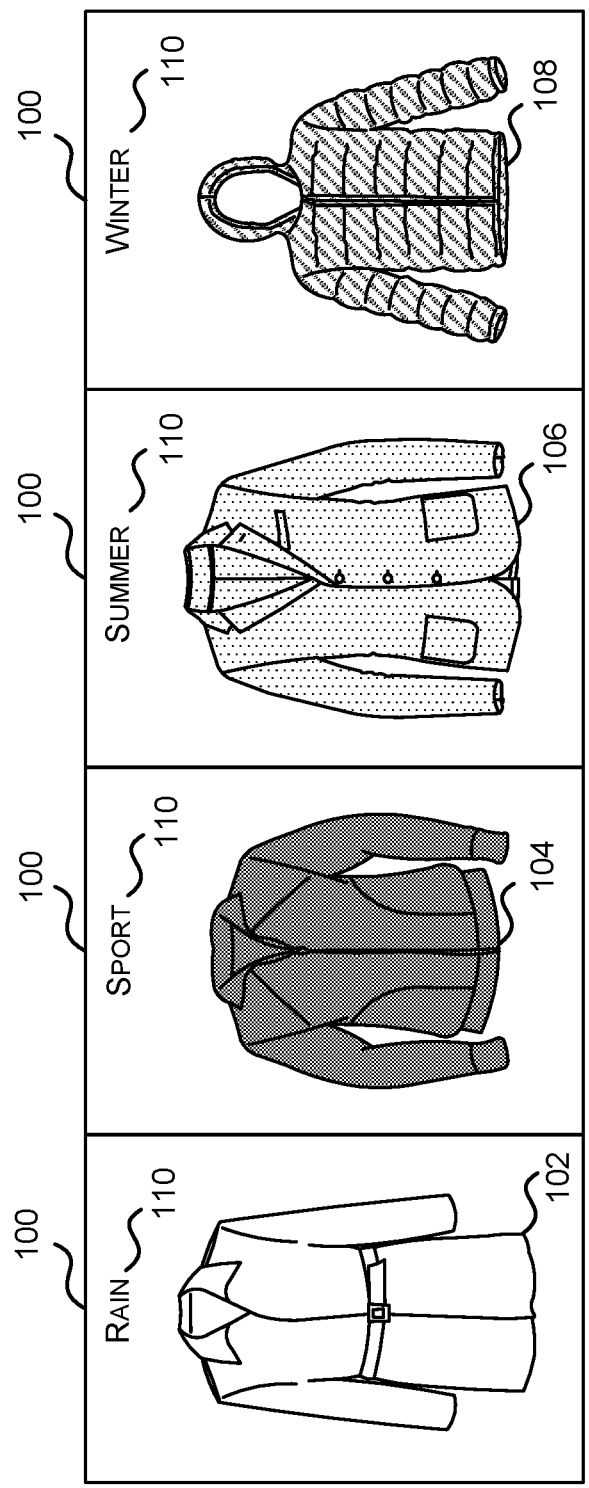
FIG. 1 is a schematic diagram of a row of rendered tiles, each tile respectively representing a rain jacket, a sports jacket, a summer jacket and a winter jacket.

Referring to FIG. 1, a starting point in this example could involve rendering four tiles representing four jackets from different categories of jackets, such as rain jackets 102, sports jackets 104, summer jackets 106 and winter jackets 108. This may provide a suitable starting point for a jacket store or for a more general store when the user has already indicated an interest in jackets, for example by entering "jackets" into a search field. In the example shown in FIG. 1, each tile is labeled with an indication 110 of the category of the jacket of the tile, although this is not essential and may be omitted in other examples The user may express an interest in one of the tiles. User interest can be detected based on various user inputs, such as selection of a tile by touch, hover, click or gaze inputs, or by scrolling towards a tile of interest. Scrolling may be implemented using various input types, such as but not limited to scrollbars, pan gestures, voice commands, mouse clicks, keyboard inputs, digital pen or stylus inputs, touch inputs, eye tracking, and other gesture inputs for virtual reality or augmented reality environments. Other non-limiting examples of input types include keypad input, gamepad input, hovering over a sensor or coming closer to a sensor (for example proximity), and tilting or shaking a device measured using an accelerometer or gyroscope.

In the example of FIG. 1, the user may for example express an interest in the tile representing the sports jacket 104. In this case, it can be inferred that the user may be interested in the category of sports jackets, and there is an opportunity to discover what specific features of a sports jacket the user wants. For example, it may be suitable to try to determine a suitable price range, brand, or colour that the user prefers. In order to determine this additional information, a classification such as colour can be selected for drilling down. In the case of colour, a plurality of tiles representing sports jackets of different colours may be presented to the user, and the user's browsing monitored to detect interest in one of the presented tiles. If the user expresses an interest in one of the presented tiles, it is likely that two tile classifications can be established: jacket type and jacket colour. In general, a tile classification defines a property or characteristic of a tile and takes a value such as a name or numerical value. For example, the classification of colour may take values such as green and red. The classification of jacket type may take values such as sports jacket and summer jacket. The classification of price may take a value of ten pounds sterling or a may take a value of a particular price bracket. The characteristics of tiles may be described in this way in terms of the values of classifications.

Figure 2:
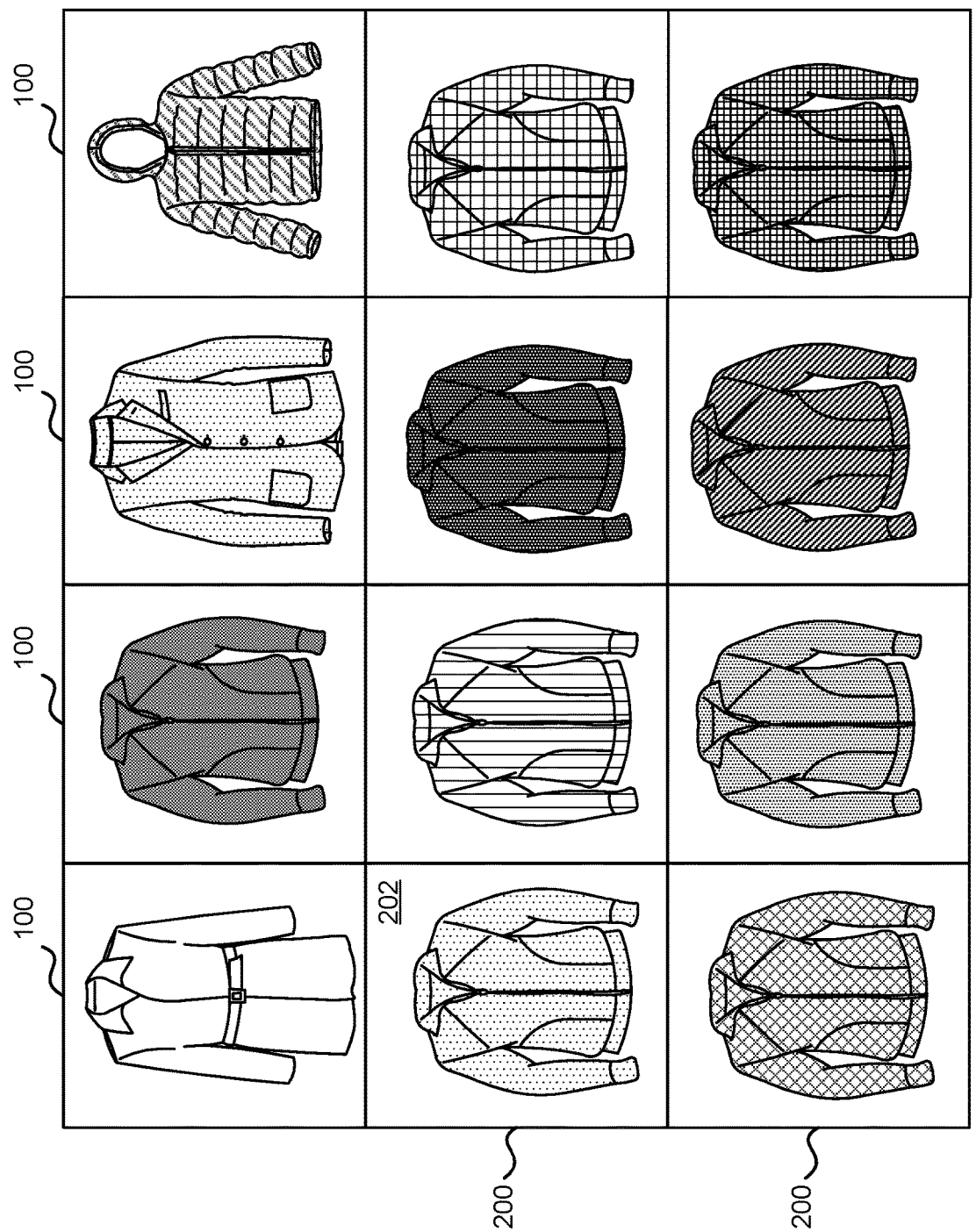
FIG. 2 is a schematic diagram of rendered tiles, the top row being the same as the row of FIG. 1, and the other rows representing sports jackets of varying colours.

In the example where the user expresses, by a first user input, an interest in the sports jacket, a new page can be displayed in which two new rows 200 of tiles represent sports jackets of different colours, as shown in FIG. 2. The original four tiles 100 are also displayed as a top row, but this is not essential and in other examples the tiles 100 may be omitted, displayed in a different location such as in the left of the viewable area, displayed in a different order, or some of the tiles 100 may be omitted whilst a subset of one or more others 100 is displayed. This approach provides opportunities for drilling down to what a user is interested in by first establishing a likely classification value of interest (e.g. the value of sports jackets in the classification of jacket types) and then providing an opportunity for detecting another classification value of interest (e.g. the value of green in the classification of colours).

Accordingly, the present disclosure presents a computing device for determining tiles of interest to a user. The computing device comprises a display, a user input receiving means, and a processing means. The processing means is configured to: render on the display a first plurality of tiles each having a respective value of a first classification; receive from the user input receiving means a first user input indicating user interest in a first tile of the first plurality of tiles, the first tile having a first value of the first classification; and in response to receiving the first user input, render on the display a second plurality of tiles each having a respective value of a second classification and being related to the first tile by having a value of the first classification within a threshold similarity of the first value.

In a suitable implementation, the second plurality of tiles may be identified by performing a search for tiles having the first value of the first classification. Accordingly, the processing means of the computing device may be configured to cause a search to be performed for tiles having the first value of the first classification.

The second plurality of tiles does not necessarily have to be rendered in place of the first plurality of tiles. The second plurality of tiles may be rendered on the screen together with the first plurality of tiles, so that tiles from the first and second pluralities of tiles are all visible to the user. Accordingly, the processing means of the computing device may be configured to render the second plurality of tiles alongside the first plurality of tiles. Alternatively, the first plurality of tiles may be omitted, displayed in a different location such as in the left of the viewable area, displayed in a different order, or some of the first plurality of tiles may be omitted whilst a subset of one or more others of the first plurality of tiles is displayed.

Returning to the example of FIG. 2, the same approach can be used to further drill down to determine another classification value that the user may be interested in. For example, if the user expresses, by a second user input, an interest in the tile 202 representing a green sports jacket, then a further set of tiles may be presented showing green sports jackets of different brands. A brand of interest to the user may be determined by detecting user interest in one of the green sports jackets of different brands.

Accordingly, the processing means of the above-mentioned computing device may be configured to: receive from the user input receiving means a second user input indicating user interest in a second tile of the second plurality of tiles, the second tile having a second value of the second classification; and in response to receiving the second user input, render on the display a third plurality of tiles each having a respective value of a third classification, being related to the first tile by having a value of the first classification within a threshold similarity of the first value, and being related to the second tile by having a value of the second classification within a threshold similarity of the second value.

In this case, the third plurality of tiles does not necessarily have to be rendered in place of the first and/or second plurality of tiles. The third plurality of tiles can be rendered on the screen together with the first and/or second plurality of tiles, so that tiles from the first, second and third pluralities of tiles are all visible to the user. Accordingly, in this case the processing means of the computing device is configured to render the third plurality of tiles alongside the first plurality of tiles and the second plurality of tiles. Alternatively, the first and/or second plurality of tiles may be omitted, displayed in a different location such as in the left of the viewable area, displayed in a different order, or some of the first and/or second plurality of tiles may be omitted whilst a subset of one or more others of the first and/or second plurality of tiles is displayed.

Figure 3:
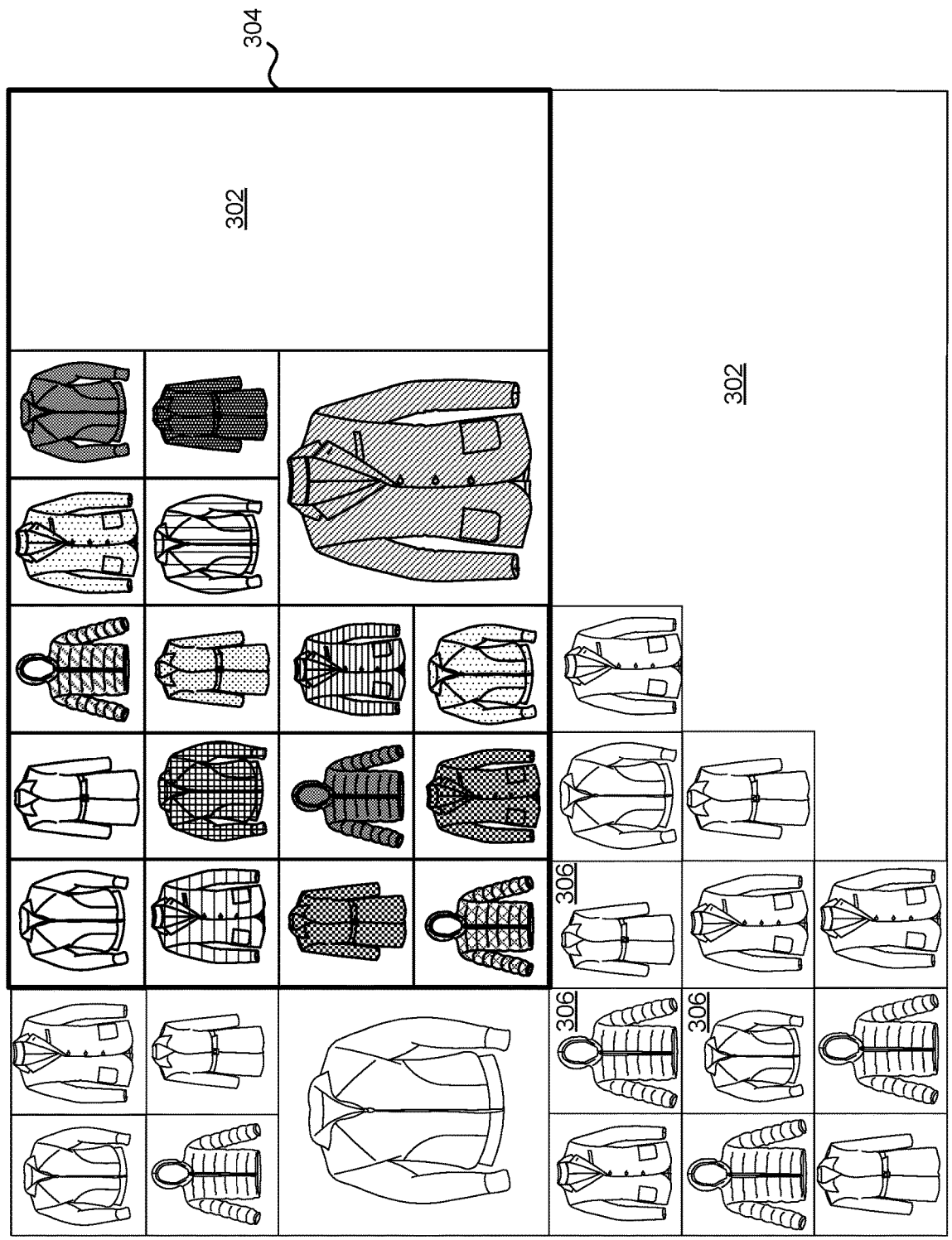
FIG. 3 is a schematic diagram of a grid of tiles that extends beyond a viewable area.

At the starting point or at any point during the drilling down, tiles may be laid out as part of a grid. Referring to FIG. 3, parts of the grid may be populated by tiles and other parts 302 may be empty. In the example of FIG. 3, the grid extends beyond a visible area 304 displayed to the user, such that the user may scroll in a direction towards the bottom left of the visible area 304 to move the visible area down and left within the grid, thereby revealing tiles 306.

Figure 4:
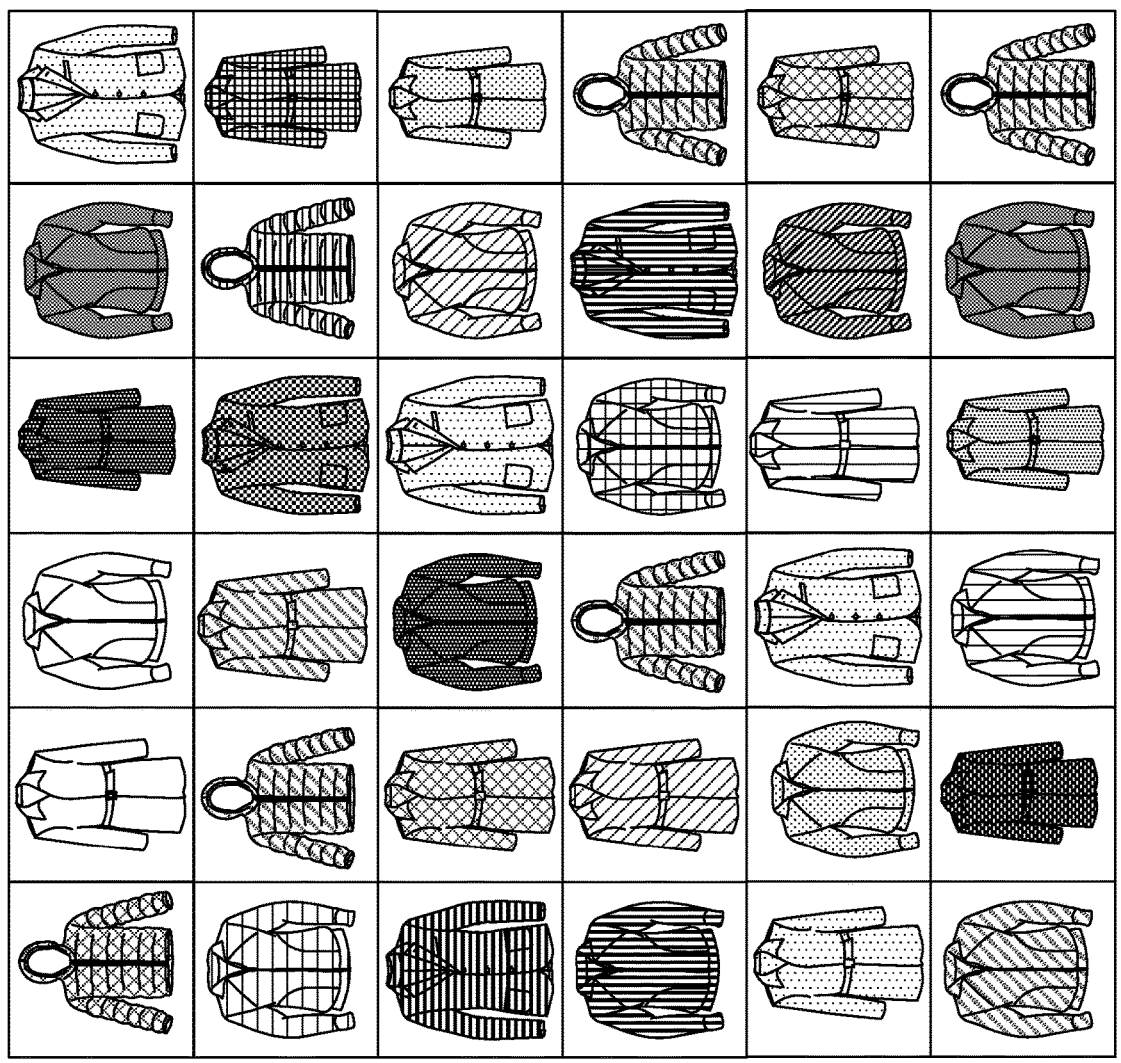
FIG. 4 is a schematic diagram of a viewable area of rendered tiles.

If there are plenty of tiles available, for example if there are two-hundred green jackets in the above example, the visible area 304 may be fully populated with tiles, as shown in FIG. 4.

Figure 5:
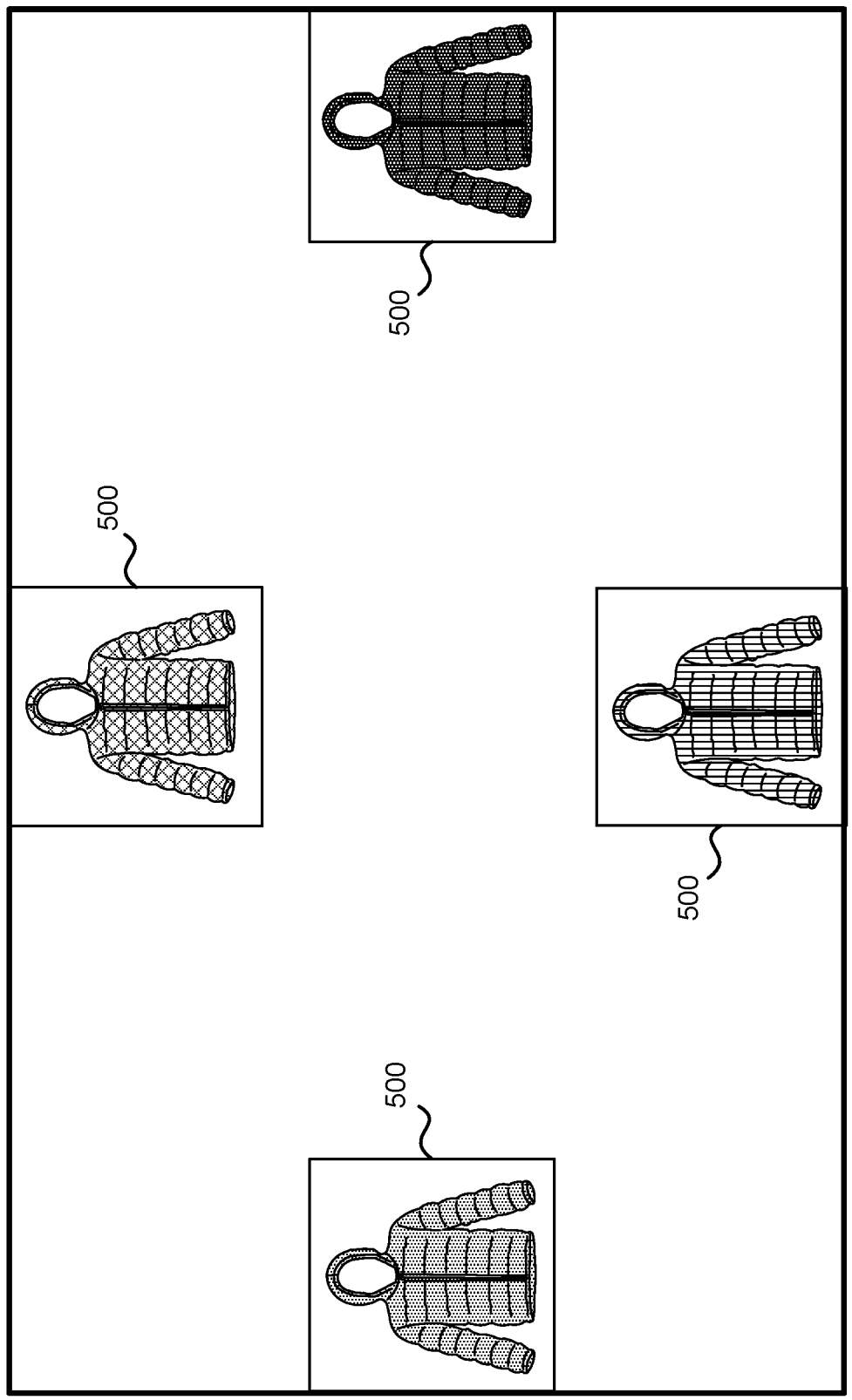
FIG. 5 is a schematic diagram showing rendered tiles in a spaced apart format.

It is not essential for tiles to be arranged in a grid or as rows or in a table. Tiles may be distributed in other ways, for example by being spaced in the arrangement of tiles 500 shown in FIG. 5, or as a graph such as a circular graph. The tiles may be rendered in a three dimensional arrangement, for example with some tiles appearing behind others. In such a three dimensional arrangement, the tiles may be spaced more widely apart from each other, for example in different areas in a three dimensional virtual or augmented reality environment.

As can be appreciated from the above disclosure, each time a user input indicating user interest in a tile is received, a hypothesis is made about a classification value of the tile that the user is interested in, and an attempt is made to create an opportunity to discover another classification value that the user may be interested in. For example, if the user indicates an interest in a sports jacket, it can be hypothesized that the user is interested in sports jackets. There is an opportunity to discover more detail about what kind of sports jacket the user is interested in by rendering on the display sports jackets of different colours, and determining which colour the user expresses an interest in.

However, it is possible to test multiple hypotheses for each user input. For example, if the user expresses an interest in sports jackets, it is possible to test not only which colour they like but also which brand they like. As a result, sports jackets of different colours can be displayed, as well as sports jackets of different sleeve length. This may enable the user's interest to be more efficiently determined if, for example, the sleeve length is more important to them than the colour. The one or more hypothesized classification values may be determined randomly, for example.

Figure 6:
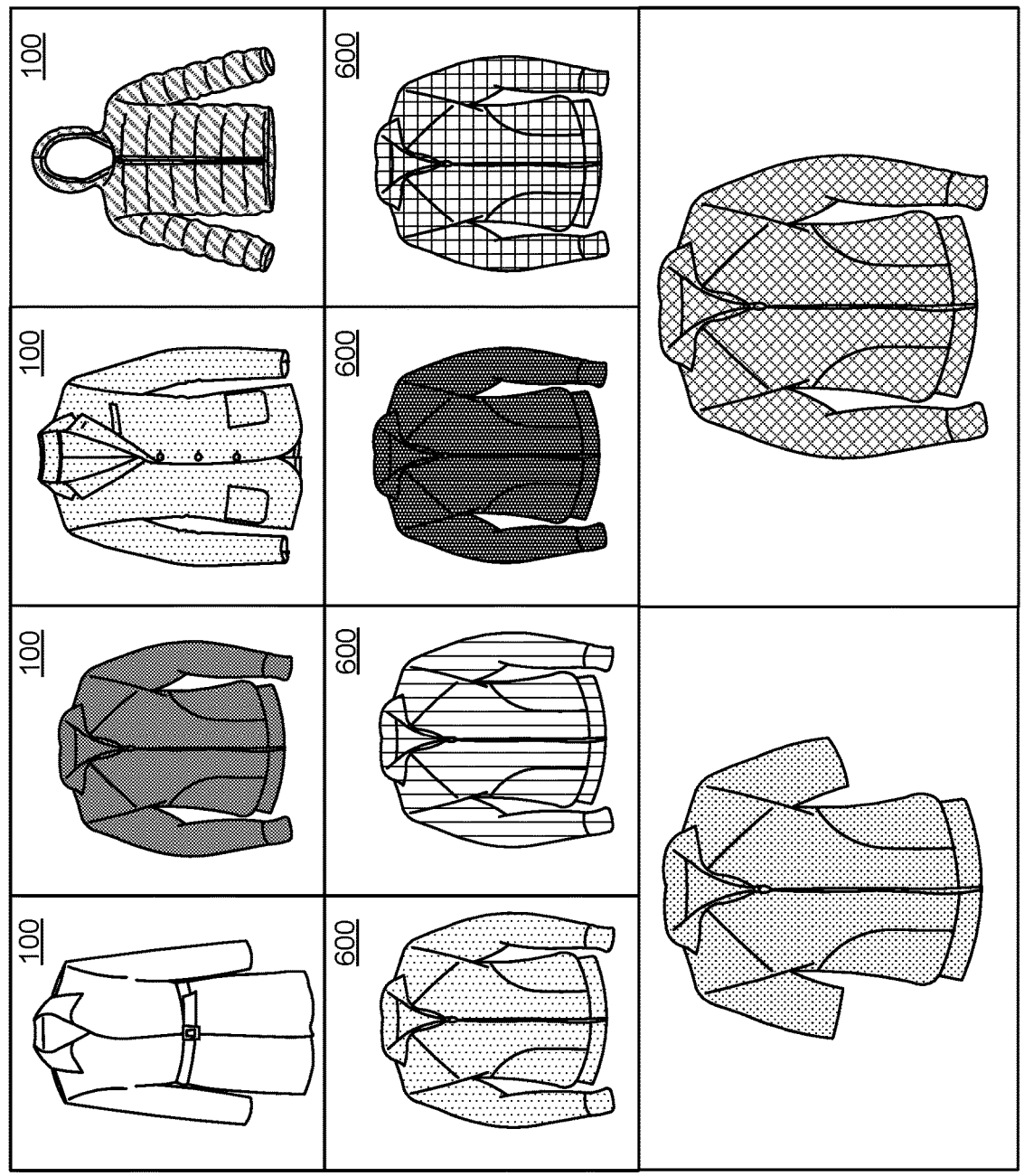
FIG. 6 is a schematic diagram of rendered tiles, the top row being the same as the row of FIG. 1, the middle row representing sports jackets of different colours, and the third row representing sports jackets of different sleeve lengths.

For example, with reference to FIG. 6, a first plurality of tiles 100 representing a rain jacket, a sports jacket, a summer jacket and a winter jacket respectively may be presented in a top row; a second row may present a second plurality of tiles 600 representing sports jackets of different colours; and a third row may present a further plurality of tiles 602 representing sports jackets of different sleeve lengths.

Accordingly, the first tile may have a further value of a further classification and the processing means of the above computing device may be configured to use the further classification by rendering on the display a further plurality of tiles each having a respective value of a yet further classification and being related to the first tile by having a value of the further classification within a threshold similarity of the further value.

This approach of using a further classification may also be used if no user interest has been detected in any of the tiles of the second plurality of tiles. Accordingly, the processing means of the computing device may be configured to render the further plurality of tiles in response to determining a lack of user interest in the second plurality of tiles.

Additionally or alternatively, the approach of using a further classification may be used if all tiles related to the first tile by having a value of the first classification within a threshold similarity of the first value have already been rendered. In this case, the further plurality of tiles could be used to fill empty tiles in the grid. Accordingly, the processing means of the computing device may be configured to render the further plurality of tiles in response to reaching a limit of the second plurality of tiles, wherein the limit comprises the condition that all available tiles that are related to the first tile by having a value of the first classification within a threshold similarity of the first value have been rendered.

In order to facilitate efficient browsing of tiles, the tiles may be rendered on the display in positions that depend on their characteristics. For example, the tiles of the second plurality of tiles are related to each other by having values of the first classification within a threshold similarity to the first value of the first classification. Based on this shared characteristic, the tiles of the second plurality of tiles may be positioned together on the display. Tiles of the third and further pluralities of tiles respectively may similarly be positioned together. Accordingly, the processing means of the computing device may be configured to arrange tiles in positions based on classification values of the tiles. For example, the processing means may be configured to group together tiles having values of a classification within a threshold similarity of each other.

Similarly, tiles sharing more than one characteristic, for example tiles representing sports jackets that are both green and short sleeved, may be positioned together in a group. Accordingly, the processing means of the computing device may be configured to group together tiles having respective values of respective classifications within a threshold similarity of each other.

Tiles that are positioned by grouping them together may be indicated as belonging to the same group using a visual indicator such as a border around the group of tiles or a label on each of the tiles in the group. Accordingly, the processing means of the computing device may be configured to render a visual indicator that tiles are grouped together.

Regardless of how many groups of tiles there are, the total number of rendered tiles is likely to be finite. In this case, infinite scrolling may optionally be provided in all directions within the plane of the display, for example by repeating the tiles when the user scrolls to the edge of the populated part of the grid. Accordingly, the processing means of the computing device may be configured to provide infinite scrolling through the rendered tiles. This provides the user with an uninterrupted browsing experience. The edge of the populated part of the grid may optionally be labeled with a visual boundary to indicate to the user that tiles beyond the border are repeated tiles.

Figure 7:
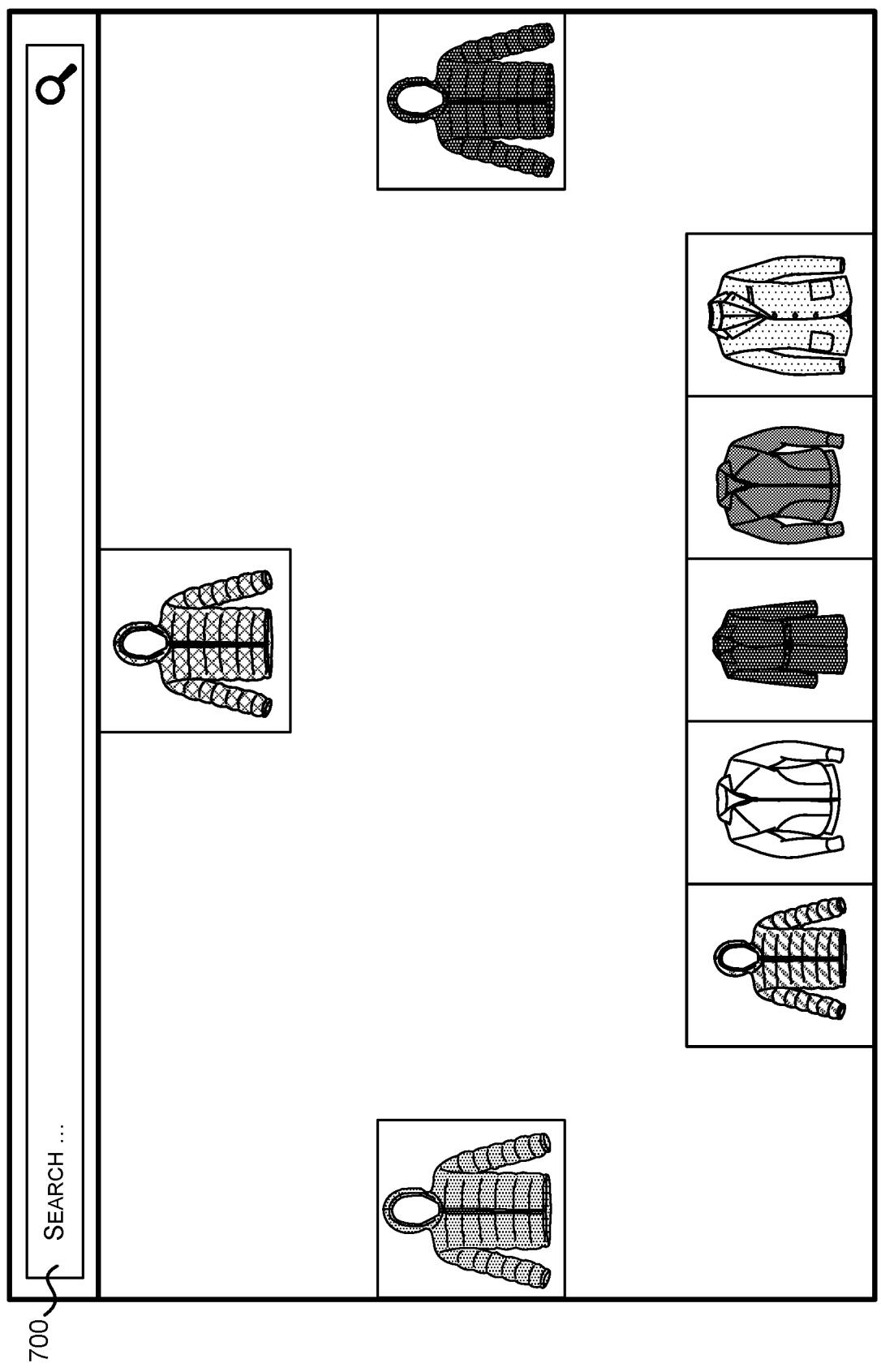
FIG. 7 is a schematic diagram showing rendered tiles and a search field.

With reference to FIG. 7, the user may wish to search for tiles with desired characteristics from among the tiles that have been rendered. In the example of FIG. 7, a search field 700 is provided to receive user input such as one or more speech or tap inputted search terms. The rendered tiles that are relevant to the search terms may be indicated to the user, for example by visually highlighting them, filtering to remove non-relevant tiles, or panning to the search results. Accordingly, the processing means of the computing device may be configured to provide a search field for receiving a search term inputted by the user and to identify to the user tiles that are relevant to the search term.

It can also be appreciated from FIG. 7 that the tiles do not necessarily have to be arranged in a table or rows or a grid, but rather can be arranged in any way around the displayed area.

In addition to searching for a subset of the rendered tiles, the user may wish to choose how the tiles are positioned and grouped together. For example, the user may want the tiles representing sports jackets by a particular brand to be positioned together in a group. The user may also want sports jackets in a particular price range to be positioned together. This may assist the user to see easily which options are available from a preferred brand or in a preferred price bracket. Accordingly, the processing means of the computing device may be configured to provide group-by options to the user to enable the user to request that tiles be rendered in groups according to user-selected classification values. In the example just provided, the classification values could for example be brand X and price bracket Y.

Figure 8:
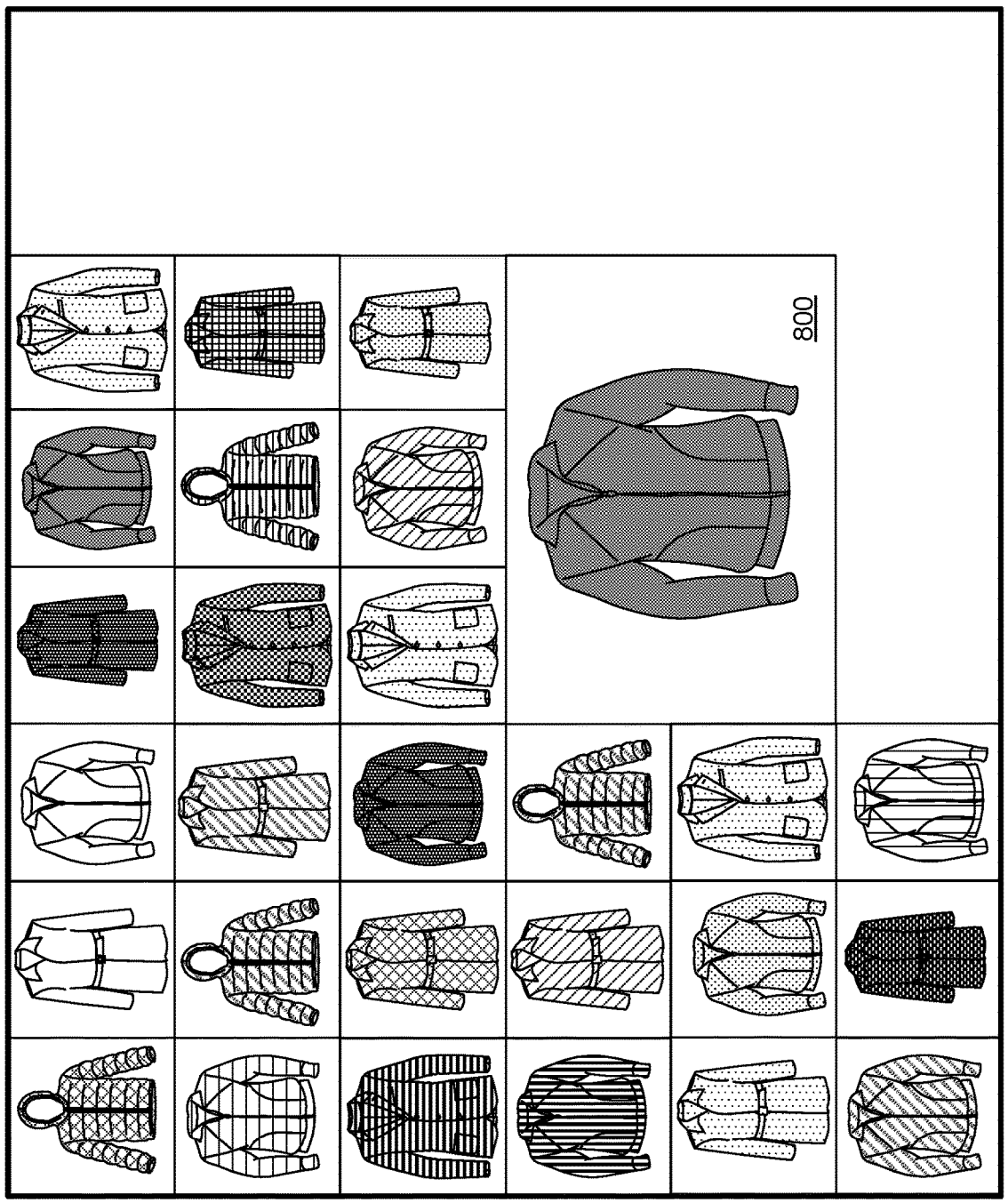
FIG. 8 is a schematic diagram showing rendered tiles that a user can select to view details.
Figure 9:
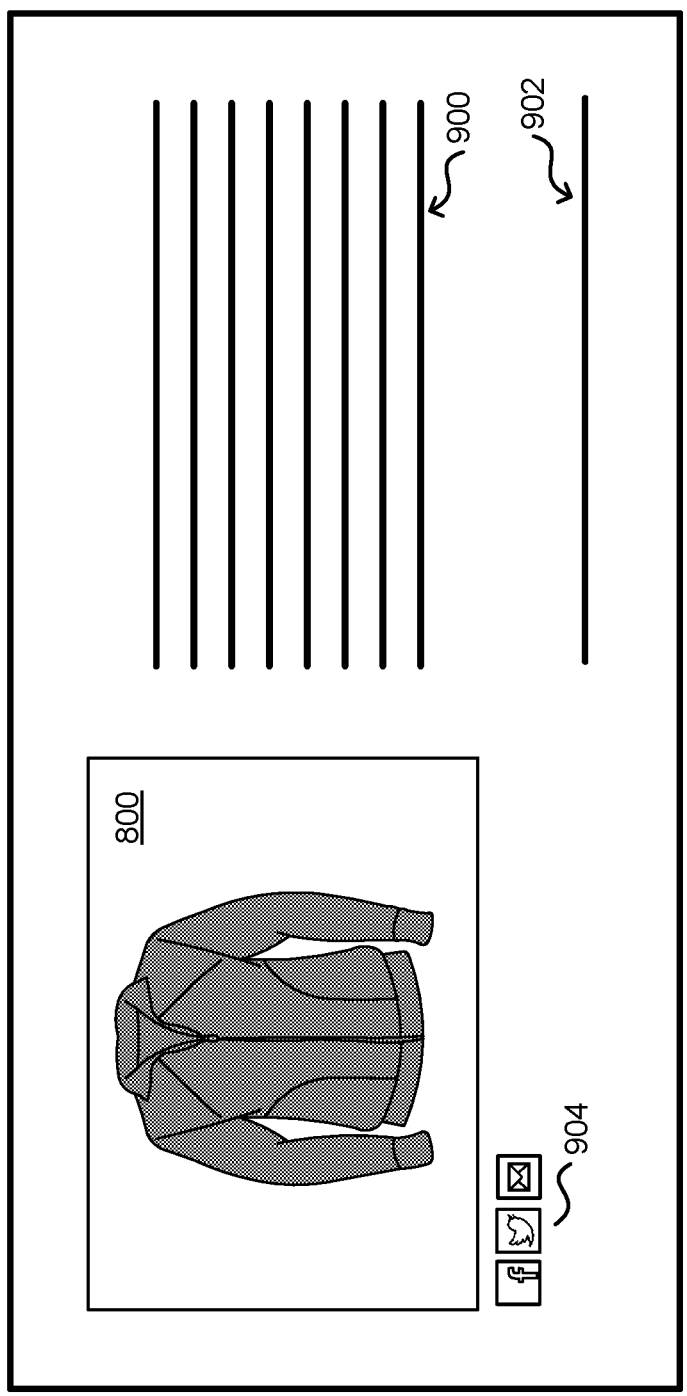
FIG. 9 is a schematic diagram showing details of a user-selected tile.

As mentioned above, the tiles can, for example, represent products or services for sale, or items or collections of information. Each tile can show one or many properties such as an image, logo, title, description, price, rating and review, as well as call to action items such as buttons. Referring to FIG. 8, a user may request further details about a tile 800 of interest, for example by providing a click input on the tile 800. Details of the tile 800 can then be provided to the user, as shown in FIG. 9. For example, text, images, audio or video 900 may be provided that describes the product and/or provides a user review of the product. In examples, a discussion board may also be provided for users to comment on the product. Links 902 to a related website and user interaction buttons 904 such as social media sharing buttons may also be provided.

Figure 10:
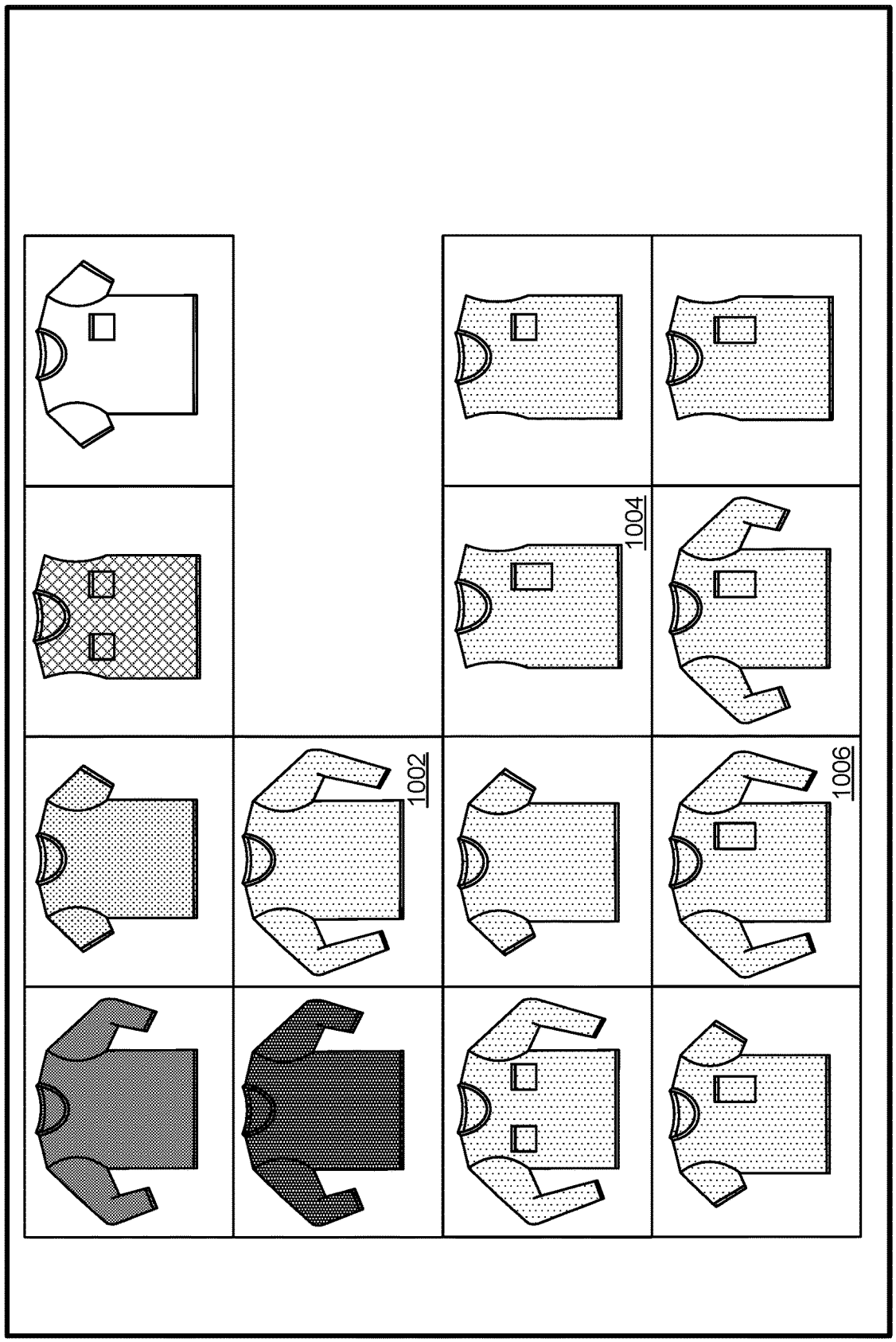
FIG. 10 is a schematic diagram showing rendered tiles in a further example related to T-shirts.

Referring to FIG. 10, a starting point in a further example could involve rendering tiles representing T-shirts. In this example, the six T-shirts of the top two rows are initially rendered, and the user expresses an interest in the tile 1002. The user interest may be detected in various ways, as described above, such as tile selection and scrolling towards a tile of interest. The system determines that the user may be interested in the colour of the T-shirt in tile 1002, which is blue. A third row of tiles is then rendered, each showing a blue T-shirt. The user expresses an interest in tile 1004, and from this it is inferred that the user may be interested in the long pocket of the T-shirt shown in tile 1004. A fourth row of tiles is then rendered, each showing a blue T-shirt with a long pocket. Finally, the user expresses an interest in tile 1006, and it may subsequently be determined that the user is interested in the long sleeves of the T-shirt shown in tile 1006. Subsequently, further tiles (not shown) may be rendered showing blue T-shirts with a long pocket and long sleeves.

Figure 11:
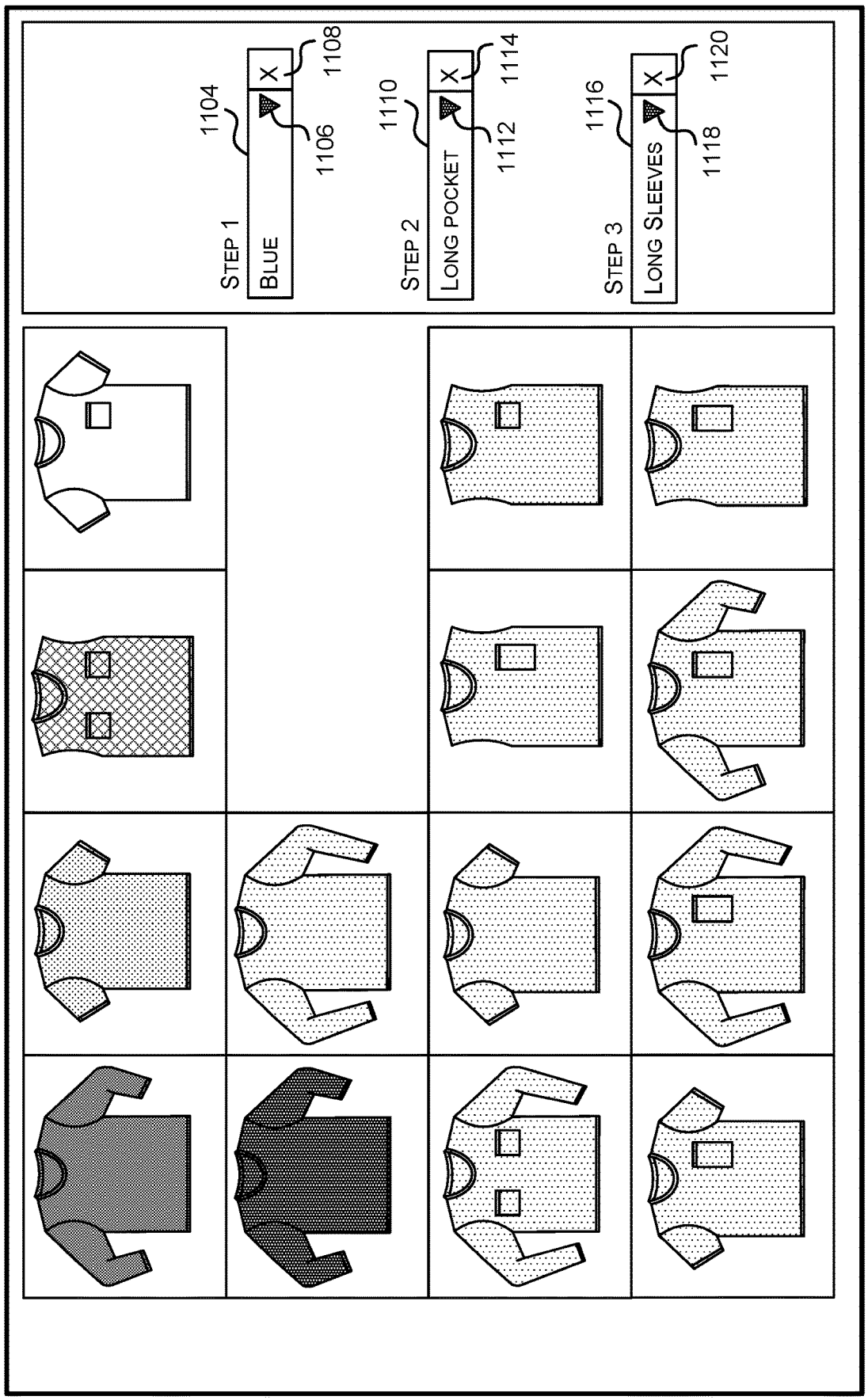
FIG. 11 is a schematic diagram showing a filtering tool in the example of FIG. 10.

If the user is not happy with the T-shirts that are being displayed, or changes his mind about what features of the T-shirt are of interest, then it is possible to manually edit the features of the T-shirts by filtering. This may be achieved using a filtering tool 1102, as shown in FIG. 11. The inferences that have been made in the three steps based on the three tiles of interest 1002, 1004 and 1006, are shown with the labels 'Step 1', 'Step 2', and 'Step 3'. The label 'Step 1' is rendered adjacent a first filter 1104 which indicates that the colour blue has been inferred from the user's interest in the first tile 1102. A dropdown input 1106 is provided to enable the user to view a dropdown menu (not shown) of alternative colours that can be manually selected to cause a search to be made of T-shirts of another colour. In other implementations, the user may select a colour by free text input. The first filter 1104 also includes an exit input 1108 which the user can select to cancel filtering by colour. Additionally or alternatively, the user may select a colour or provide an exit input using a voice command.

Similarly, the label 'Step 2' is rendered adjacent a second filter 1110 which indicates that long pockets have been inferred from the user's interest in the second tile 1104. A dropdown input 1112 is provided to enable the user to manually select other pocket options, and an exit input 1114 is provided to enable the user to cancel filtering by pocket options.

Finally, the label 'Step 3' is rendered adjacent a third filter 1116 which indicates that long sleeves have been inferred from the user's interest in the third tile 1106. A dropdown input 1118 is provided to enable the user to manually select other sleeve length options, and an exit input 1120 is provided to enable the user to cancel filtering by sleeve length options.

Figure 12:
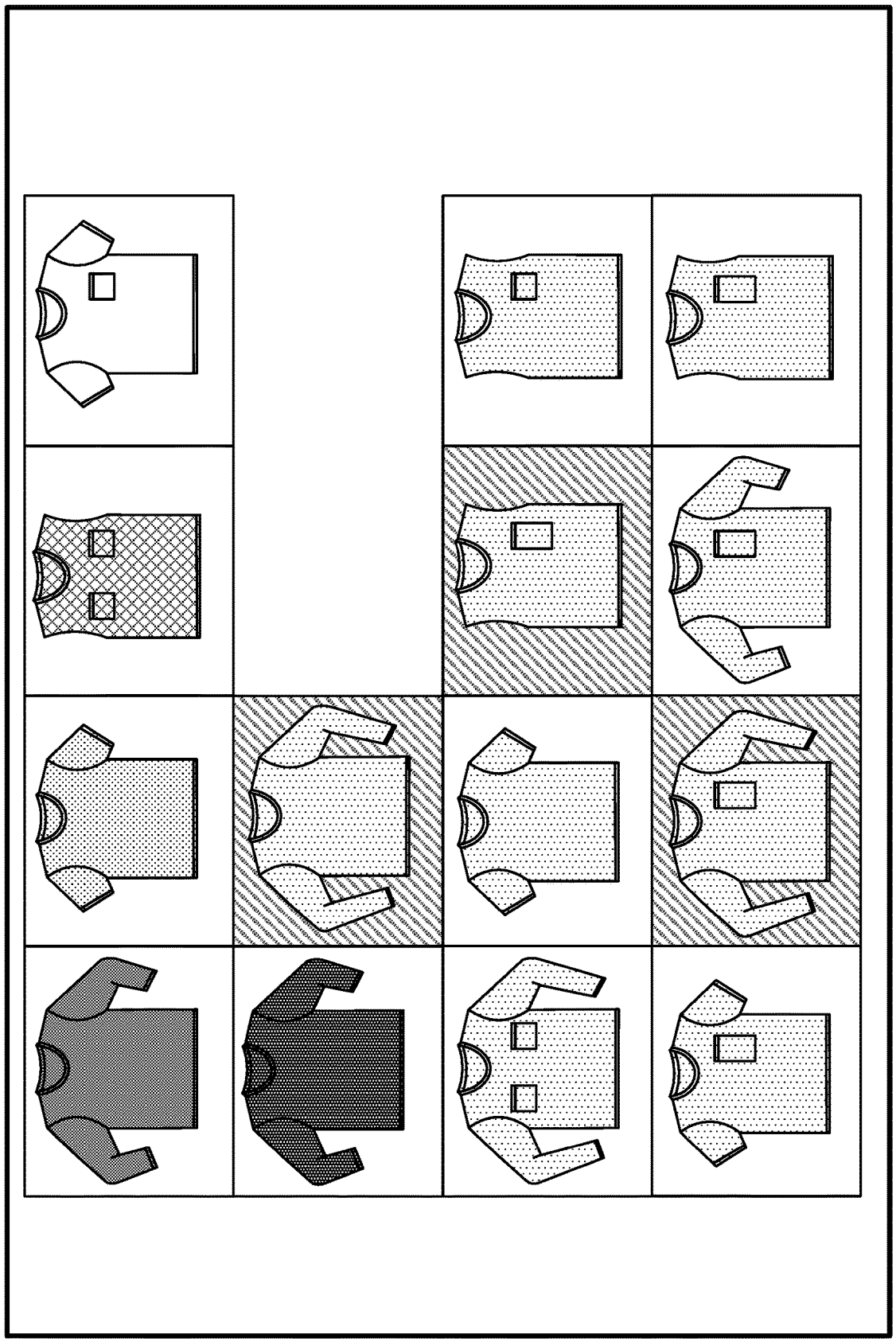
FIG. 12 is a schematic diagram showing a special mode of operation in the example of FIG. 10.

In another mode of operation, instead of displaying a filtering tool 1102 to the user, a special mode of operation can be entered in which the tiles that have contributed to the inferences made about the user's interests are highlighted. This may involve shading the background or otherwise identifying the tiles in question. For example, following the example of FIG. 10, the tiles 1002, 1004 and 1006 that the user has expressed an interest in can be highlighted to the user as shown in FIG. 12. This may assist the user in seeing the logic with which the system has attempted to infer which values of which classifications may be of interest to the user.

It is likely that the number of classifications which are used to drill down to what the user is interested in is finite. For example, in the T-shirt example described above, there may be just eight classifications: colour, pockets, sleeve length, price, brand, fabric, patterns, and whether the T-shirt is non-iron. In this case, the system may drill down using all eight classifications, and there will be no further classifications to use. At this stage, all the displayed tiles have the same values of the respective eight classifications, and these values have been inferred using user browsing behaviour. Thus, a focused subset of tiles is displayed which is likely to provide tiles of interest to the user. If the user finds a tile of interest, he may, for example, select the tile of interest and proceed with further options that may be available, such as add to wishlist, add to basket and go to checkout.

However, in case the user is not satisfied with his choice, or does not wish to show interest in or commit to one of the tiles belonging to the focused subset, other tiles that do not belong to the focused subgroup may be displayed to help the user find different tiles that may be of interest. For example, if all the T-shirts in the focused subgroup are blue, then colour can be disregarded and T-shirts in a range of colours may be displayed. The tiles may still have the same values of the other seven classifications as the focused subgroup, but the user is given other colour options in case it is the colour that the user is not happy with. Further classifications may be disregarded as required, and T-shirts in a range of pocket arrangements, sleeve lengths, prices and so on could be opened up sequentially to display tiles having a range of values of each of these classifications until the user expresses an interest in a displayed tile. The order in which classifications are disregarded may be determined in various ways. For example, the latest inferred classification may be disregarded first, the earliest inferred classification may be disregarded first, an order specified by the enterprise using the system may be followed (for example an order based on sales data determined by an enterprise such as an app vendor), classifications may be disregarded in a random order, or classifications may be disregarded in alphabetical order. Alternatively, all eight classifications could be disregarded at once, and tiles having a range of values of all the classifications could be displayed.

Even if the user is satisfied with his choice, it may be suitable to display further tiles not belonging to the focused subset. For example, this may be appropriate if there is an opportunity to sell additional products that may be related to products represented by the tiles belonging to the focused subset.

If the user appears to show no interest in the tiles belonging to the focused subset, then it may be suitable to display other tiles after the focused subset has been displayed for a predetermined time limit without attracting user interest.

Tiles not belonging to the focused subset may be displayed in a random layout. For example, if all the classifications are disregarded then tiles providing a range of values of the classifications may be displayed in a random order or random configuration on the screen. Alternatively, groups of tiles may be displayed in which only one classification is opened up (i.e. has a range of values) in each group. For example, one group may have tiles of a range of colours. An adjacent group may have tiles having a range of sleeve lengths. This pattern may continue, optionally eventually repeating to provide infinite scrolling. In this repeating pattern, the classifications that are opened up may, for example, be displayed in the same or reverse order as the order in which the classifications were originally drilled down. Any other order, such as a random, alphabetical, or proprietary order of the classifications, may also be suitable.

It will be appreciated that the order in which classifications are used to drill down to what the user is interested in may affect the efficiency with which tiles of interest can be determined. For example, in the above example of eight classifications of T-shirts, the following classifications in the following order are used.

Colour, Pockets, Sleeve Length, Price, Brand, Fabric, Patterns, Non-Iron

However, it may be found that for most users price has a greater influence on finding a suitable T-shirt than pockets or sleeve length. For example, it may be that even if T-shirts with suitable colours, pockets and sleeve length are presented to the user, if they are all too expensive the user will not buy. In this case, it may be more likely to lead to a successful outcome such as a sale if price is used to filter the products earlier in the process, such as immediately after the colour classification. In this case, the following order of classifications may lead to more sales and a more efficient and effective determination of T-shirts of interest to the user.

Colour, Price, Pockets, Sleeve Length, Brand, Fabric, Patterns, Non-Iron

In general, classifications that are more important to the user should be presented earlier in the process. In some examples, this may be expressed by saying that classifications having a better ability to lead to a sale should be used first. This may be automatically inferred from previous sales data.

Other ways of assessing the suitability of a classification and how early it should be used include the ability of a classification to split up a set of items. For example, if there are one hundred T-shirts and only two are non-iron, then being non-iron is a sparse property and the classification of whether the T-shirt is non-iron does not split the set of products well. In this case, non-iron is not a high performing classification for determining which T-shirts are of interest to the user. A diverse and reasonably evenly distributed classification is preferred which splits the items into a reasonable number of comparably sized groups.

Another factor to consider is that some classifications may not support easy decision-making for the user between values of the classification. For example, it may be more difficult for the user to choose between fabrics than between colours. In this case, colour is a more effective classification and should be used before fabrics. The classification of colours can be said to enable the user to direct the search more easily than the classification of fabrics.

Each classification may be scored based on a set of performance criteria, such as:
  Ability to split up the set of products
  Ability to enable the user to direct the search
  Ability to lead to a sale These may be combined to give an overall score for each classification, and the classification with the overall score indicating best performance can be used first. The classifications may then be used in the order of their overall scores thereafter in the process of determining items of interest. If a dead-end is reached (i.e. the available classifications have been used and the user still cannot find an item of interest), then the process may be rolled back by disregarding classifications as described above. In this case, it may be suitable to explore different classifications, or to explore the same classifications in a different order, by calculating a different overall score for each classification using a different formula. In some implementations there could be many such formulae and the formula selected could depend on the stage in the process. Formulae that produce the same score at the same stage could be ignored.

It would also be suitable for the user to be provided with input means such as buttons or drop down menus for manually selecting the classifications by which to search. In this case, it may be suitable to determine the user's favorite classifications and/or classification orders and to automatically bias towards using these classifications and classification orders in future searches. Alternatively, the classifications to be used and the order in which they are to be used may be preset by an enterprise manager, for example a manager of an online clothing store.

When a classification such as colour or price has been chosen for presenting options to the user, it has also to be determined which values of that classification should be presented to the user. For example, if the classification of colour is to be used first in a search for T-shirts, the question becomes which colour options to present to the user. If four values of colour are to be presented, should these be red, cream, blue and grey, or red, black, khaki and white, or another combination? In order to select the values of colour, or the values or value ranges of any classification, one or more of the following performance criteria may be considered.

Popularity among users
Most common in inventory
Include one wildcard (e.g. to show a value of a different classification)
Bias towards user's known preferences
Ability to enable the user to direct the search
Ability to lead to a sale
Match with weather forecast (e.g. rain jackets if rain is forecast) using data from an external service
Match with stock availability using data from an external service The skilled person will appreciate that there are various ways to define or measure some of the performance criteria. For example, the ability of a classification, value or value range to enable the user to direct the search can be measured by tracking user confusion or delays in user choice, for example based on eye tracking. If a user struggles to make a choice or picks three out of four options, this indicates that the classification or values are not enabling the user to choose well. If a user cannot choose, a back button may be provided or another gesture such as a voice command of 'I can't choose' may be used by the user to instruct the system to abandon a set of values or value ranges or a classification, and attempt to provide the user with a different set of options. Furthermore, the ability of a classification, value or value range to lead to a sale or to enable the user to direct the search can be individualized to a user, based on global trends among all users, or both. Popularity among users may, for example, be inferred from information in social media networks.

Values may be discrete or continuous. For example, discrete values for a size classification may include small, medium and large. Continuous values for a clothing size classification may include ranges of waist sizes in centimeters or inches. Colour can be treated as text labels such as blue and red, or as continuous red-green-blue (RGB) values. Alternatively, colour options may be grouped in other ways, such as three categories of black, white and colorful. There may also be other textual classifications such as jacket type which may take values such as winter jacket, summer jacket, sports jacket and so on.

Finally, it must be determined which instances of a selected value of a selected classification are to be presented to the user. For example, if T-shirts are first to be split by colour, and the four colours red, black, khaki and white are to be presented, then the question becomes which red T-shirt, which black T-shirt, which khaki T-shirt and which white T-shirt should be chosen. Instances may be selected based on a range of factors, including for example:

Most purchased among users
Bias towards a user's known preferences

In some examples, the classification, value or value ranges, and instances may be selected randomly or may be instructed by the user by voice or other command or gesture. They may also be selected based on popularity by virtue of having been frequently selected by users in previous searches. Other selection criteria may also apply such as the ability to lead to the best profit margin. For example, if it is known that a competitor is selling a large volume of a particular item, then it may be suitable to bias towards the selection of values, value ranges or instances of items that are similar.

The positioning of tiles when presented to a user may also be affected by the tiles' characteristics. For example, tiles that are more expensive may be positioned in the centre of the screen, or alternatively tiles may be presented in a row in order of price or in order of oldest to newest, for example. Entities in the supply chain such as manufacturers or brands may also pay for placement of their products in certain positions. In some circumstances it may be suitable to select the positioning of the tiles randomly.

In an important variation, different classifications can be tried simultaneously. For example, a cluster of tiles showcasing jackets of different colours could be presented to the user alongside another cluster of tiles showcasing jackets of different prices. Other clusters of tiles could also be presented showcasing jackets of a range of pockets, a range of sleeve lengths, a range of brands, and so on. In this arrangement, each cluster is designed to allow the user to explore a particular classification and decide if one or more values or value ranges of that classification are of interest. However, the presence of multiple clusters, each for a different classification, also enables the user to glance around and easily find a classification which is useful to them for identifying jackets of interest. Since different users may find different classifications more useful, this provides a powerful tool for increasing the user's options for how to explore the jackets, and also for tracking which classifications are found to be more usable than others, either for individual users or across large groups of users. Based on this kind of tracking, more suitable classifications can be used, either for all users or in a way that is tailored to a particular user, to help users explore jackets and other items more easily and more fruitfully. It may be suitable to show clusters for more popular classifications in more prominent positions. For large screens, it is suitable to present to the user as many clusters as necessary to fill the screen. In three dimensional displays, such as three dimensional virtual or augmented reality environments, different clusters can be rendered in front of or behind each other. In a virtual reality or augmented reality environment it may also be suitable for different clusters to be spaced apart from each other.

The full list of classifications applying to a particular set of items or a particular inventory may be derived from metadata of the tiles. Once the full list of classifications is established, the maximum number of clusters can be determined, although one cluster may in some cases be displayed twice, for example for infinite scrolling or simply to fill a screen. Access control may apply to clusters in the sense that some classifications may be made unavailable to certain users.

As well as detecting user interest in certain tiles, for example based on gaze input or scrolling towards a tile of interest, negative user inputs indicating dislike or a lack of interest may also be detected. For example, an absence of interest or a voice command saying "I don't like blue" may be detected and used as negative inputs. Based on these, the characteristics that are not liked or not of interest may be excluded from being presented to the user. This helps to further narrow down what the user may be interested in and promote only liked or interesting items for being displayed.

Multi-selection may also be supported, for example to determine multiple colours that the user may be interested in, or multiple combinations of characteristics. For example, it may be determined based on user input that a user likes blue or white jackets that are ideally inexpensive but otherwise quite expensive but not very expensive. Other combinations are detectable, such as a user that shows an interest in white expensive jackets or blue inexpensive jackets.

Pinning may optionally be supported in which a user may pin a tile by instructing the interface to keep the tile displayed until it is unpinned, regardless of future selections of (i.e. expressions of interest in) other tiles. The user may instruct the system to pin a tile by various input means. For example, the user may use a voice command such as 'pin this' or 'remember this for later' combined with gaze input directed at the tile in question. In other examples the user may use a voice command such as 'pin the blue jacket' or 'unpin the grey jacket with the long sleeves'.

A user profile may be built by observing and recording user behaviour and/or by building a profile of characteristics of the user such as gender, age, and location. User information may be mined from social media and other accounts of the user, providing that the user's permission to do so has been obtained.

User behaviour such as browsing behaviour and purchasing behaviour may be used to build a profile of items and product characteristics that the user has expressed an interest in. User interest may be received as a signal based on user input such as eye tracking or tap input directed to a particular tile. Scores or weights representing a level of user interest can be assigned and stored in a user profile as follows. In the following example 0.1 indicates a low level of interest and 1.0 represents a maximum level of interest.

Example

| | |
|---|---|
| Jacket-0.9-colour-blue-0.8-slevelength-long-0.8 | product of scores is 0.576 |
| Jacket-0.9-colour-blue-0.8-slevetength-medium-0.4 | product of scores is 0.288 |
| Jacket-0.9-colour-grey-0.6-slevelength-long-0.8 | product of scores is 0.432 |

This example represents a user who is highly interest in jackets, particularly blue jackets, preferably having long sleeves. Each item and its scores, for example the blue, long-sleeved jacket and its scores, represent a data point in the user profile. An overall score for each data point may be calculated, for example by finding the product of the individual scores.

The system may optionally store a time sequence in which the user showed interest in data points. For example, the above interest in jackets may be recorded as occurring in June, while in July the same user expresses an interest in trousers.
June-jacket-0.9-colour-blue-0.8-slevelength-long-0.8
June-jacket-0.9-colour-blue-0.8-slevelength-medium-0.4
June-jacket-0.9-colour-grey-0.6-slevelength-long-0.8
July-trousers-0.8

This enables the system to recognise that in July trousers that are blue or grey, or that match or coordinate with blue or grey, should be presented to the user before trying other colours. In this way the system assumes that there is a preference for blue, grey or colours that coordinate with blue or grey, whilst still allowing users to choose other colours.

More general user preferences may also be stored in the user profile. For example, if a user prefers clothes in a particular price bracket, then there should be a bias towards presenting clothes in that price bracket to the user.

The interface can be used not only to determine items of a particular type, such as jackets, that are of interest to a user, but also to determine different types of products that are suitable for being merchandised in conjunction with the jackets. For example, if it is determined that the user is interested in blue jackets, it may be appropriate to additionally present coordinating sports gear and accessories or coordinating trousers.

The interface may be configured for use by a merchandising buyer. If the merchandising buyer is interested in a particular jacket, then the jacket can be given a score boost of 0.2 in the merchandising buyer's profile, for example up to a maximum score of 1.0.

In other examples, the interface may be configured such that a salesperson may register their own selling preferences with the display system, so that the choice of objects, as well as the choice of which categories are explored before others, may be influenced by what the seller is best able to sell. This may be suitable if, for example, the salesperson is a specialist in a particular range of products. In this way, the display system may take into account not only the customer's behaviour and the customer's profile, but also the salesperson's preferences and expertise.

The starting point of a search, such as a search for T-shirts, jackets or trousers, can be established from the context of a search using cookies from the user's previous or recent browsing history. For example, if the user has recently completed a search on a department store's website for trousers, then the starting point could be a selection from a range of differently coloured trousers. The data could be stored in the cookies, or alternatively a reference to a logged-in user could be stored and the actual browsing history or other context data could be stored in a backend database. Additionally or alternatively, context data could be provided by a sensor or scanner. For example, an airline customer could preselect movies to watch on a flight based on their scanned boarding pass. In this implementation, the system is configured to pre-filter the available movies based on the airline which is determined using the scanned boarding pass.

The starting point may additionally or alternatively be influenced by a set of suggestions based on a user profile, an average profile of users (i.e. global trends), or a set of statically defined data points. Other influencers may comprise for example what sells well and user location (e.g. only search among contents of a nearby warehouse).

In the above examples, the end user is generally a customer searching for products in an online shopping experience. However, the user interface may be used in a range of applications, including for example an image search facility in a company. In this application the end user may be an employee of the company tasked with finding suitable images to be included in an advertisement campaign. There may be other types of end users within the company such as an administrator role having different permissions in the interface to the searcher role, for example being able to impose access restrictions on the searcher to prevent certain images from being accessible in the search. This may be suitable if for example, some images include an old logo of the company that should not appear in the new advertising campaign, or if the latest images are not to be leaked.

The searching environment may determine images of interest to the searcher using various image classifications, such as photoshoot location, model gender, and so on. Alternatively, the searcher may select the desired values of his or her chosen classifications in order to direct the search. In a further alternative, the administrator may customise the environment to fix the order in which image classifications are used to infer user preferences. For example, the environment can be configured to ensure that the searcher is first shown a range of images having different photoshoot locations. The photoshoot location can be inferred from user browsing behaviour, after-which images from the inferred photoshoot location having different model genders can be presented to the searcher to infer a preferred model gender. A fixed series of classifications can in this way be imposed by the administrator for the first part of the search. This may help in training the searchers or enabling more efficient searches. Other classifications may include, for example, project name, department name and so on. This information about each image can be saved as metadata of the image.

Figure 13:
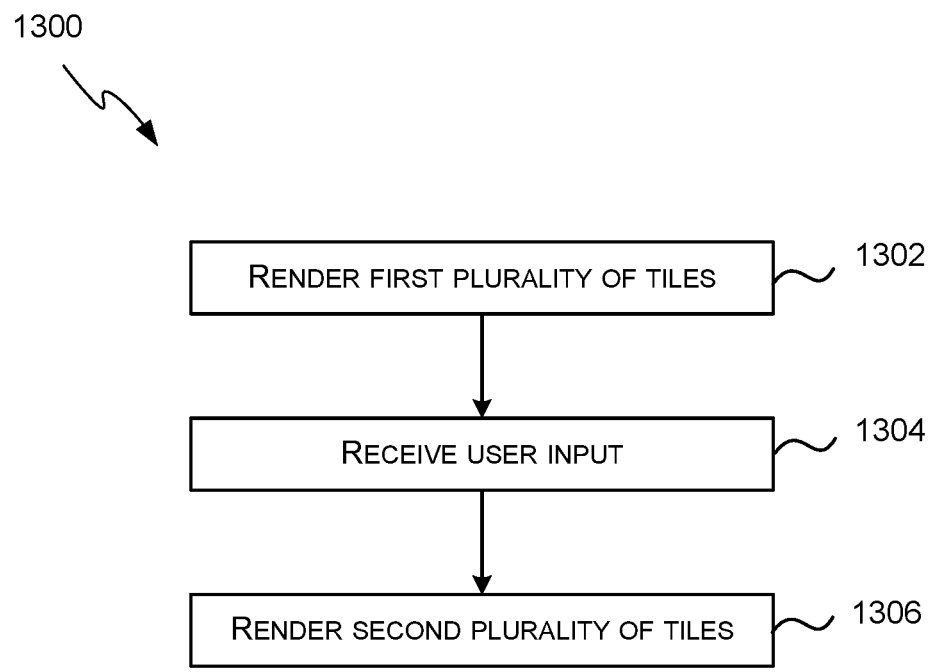
FIG. 13 is a flow chart showing a method of determining tiles of interest to a user.

With the above disclosure in mind, a method 1300 is presented for determining tiles of interest to a user. Referring to FIG. 13, the method 1300 comprises rendering 1302 on a display a first plurality of tiles each having a respective value of a first classification; receiving 1304 from a user input receiving means a first user input indicating user interest in a first tile of the first plurality of tiles, the first tile having a first value of the first classification; and in response to receiving the first user input, rendering 1306 on the display a second plurality of tiles each having a respective value of a second classification and being related to the first tile by having a value of the first classification within a threshold similarity of the first value.

Figure 14:
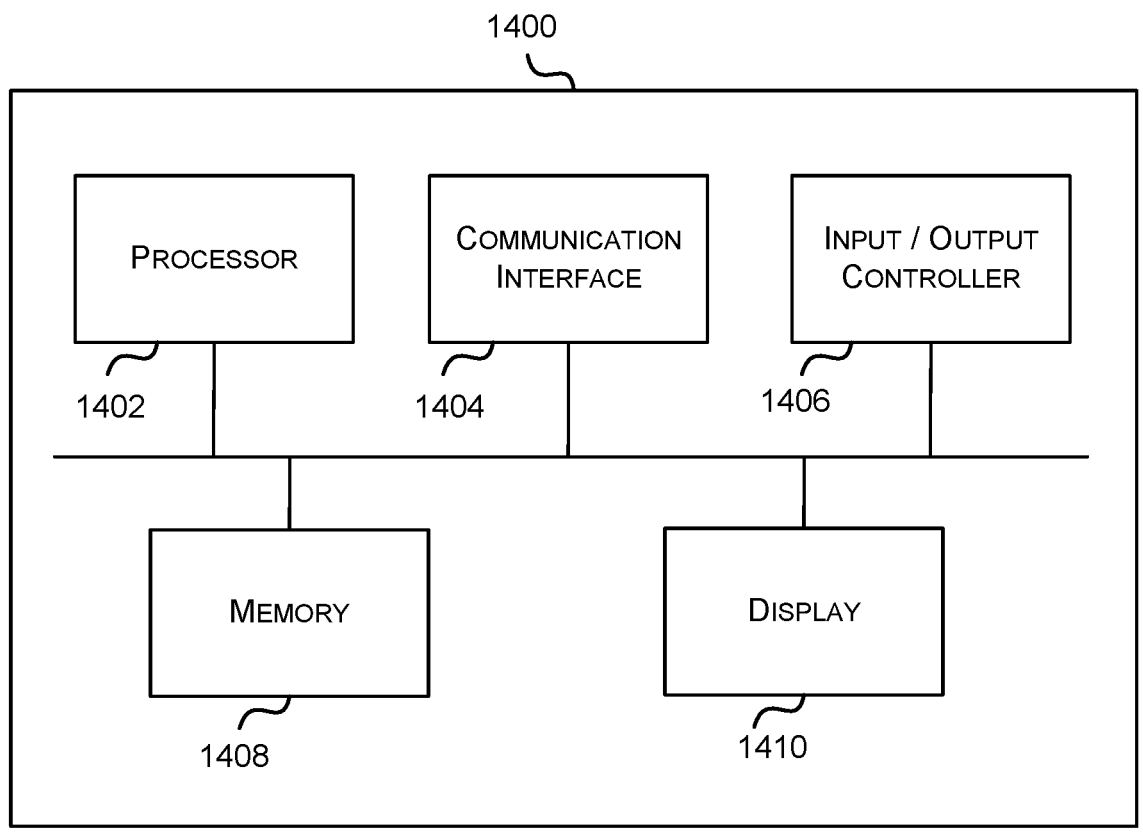
FIG. 14 is a schematic diagram of an exemplary computing device in which the method of FIG. 13 may be implemented.

A computing device 1400 suitable for implementing the method 1300 is shown in FIG. 14. The computing device 1400 comprises a processor 1402, a communication interface 1404, an input/output controller 1406, computer memory 1408, and a display 1410. The processor 1402 may be configured to implement the method 1300 using the display 1410, a user input receiving means in communication with the input/output controller 1406, and instructions stored in the memory 1408.

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Computer executable instructions are provided using any computer-readable media that is accessible by a computing based device such as computing device 1100. Computer-readable media includes, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory) is shown within the computing-based device it will be appreciated that the storage is, in some examples, distributed or located remotely and accessed via a network or other communication link (e.g. using communication interface).

The computing-based device also comprises an input/output controller arranged to output display information to a display device which may be separate from or integral to the computing-based device. The display information may provide a graphical user interface. The input/output controller is also arranged to receive and process input from one or more devices, such as a user input device (e.g. a mouse, keyboard, camera, microphone or other sensor). In some examples the user input device detects voice input, user gestures or other user actions and provides a natural user interface (NUI). In an embodiment the display device also acts as the user input device if it is a touch sensitive display device. The input/output controller outputs data to devices other than the display device in some examples, e.g. a locally connected printing device.

Any of the input/output controller, display device and the user input device may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

A first further example provides a computing device for determining tiles of interest to a user, the computing device comprising: a display; a user input receiving means; and a processing means configured to: render on the display a first plurality of tiles each having a respective value of a first classification; receive from the user input receiving means a first user input indicating user interest in a first tile of the first plurality of tiles, the first tile having a first value of the first classification; and in response to receiving the first user input, render on the display a second plurality of tiles each having a respective value of a second classification and being related to the first tile by having a value of the first classification within a threshold similarity of the first value.

The first further example may additionally comprise any combination of one or more of the following aspects:

- The processing means may be configured to: receive from the user input receiving means a second user input indicating user interest in a second tile of the second plurality of tiles, the second tile having a second value of the second classification; and in response to receiving the second user input, render on the display a third plurality of tiles each having a respective value of a third classification, being related to the first tile by having a value of the first classification within a threshold similarity of the first value, and being related to the second tile by having a value of the second classification within a threshold similarity of the second value.
- The processing means may be configured to: render the third plurality of tiles alongside the first plurality of tiles and the second plurality of tiles.
- The first tile may have a further value of a further classification and the processing means may be configured to use the further classification by rendering on the display a further plurality of tiles each having a respective value of a yet further classification and being related to the first tile by having a value of the further classification within a threshold similarity of the further value.
- The processing means may be configured to: render the further plurality of tiles in response to determining a lack of user interest in the second plurality of tiles.
- The processing means may be configured to: render the further plurality of tiles in response to reaching a limit of the second plurality of tiles, wherein the limit comprises the condition that all available tiles that are related to the first tile by having a value of the first classification within a threshold similarity of the first value have been rendered.
- The processing means may be configured to: cause a search to be performed for tiles having the first value of the first classification.
- The user input may comprise scrolling towards a tile of interest.
- The user input may comprise selecting a tile of interest.
- The processing means may be configured to: render the second plurality of tiles alongside the first plurality of tiles.
- The processing means may be configured to: arrange the tiles in positions based on classification values of the tiles.
- The processing means may be configured to: group together tiles having values of a classification within a threshold similarity of each other.
- The processing means may be configured to: group together tiles having respective values of respective classifications within a threshold similarity of each other.
- The processing means may be configured to: render a visual indicator that tiles are grouped together.
- The processing means may be configured to: provide infinite scrolling through the rendered tiles.
- The processing means may be configured to: provide a search field for receiving a search term inputted by the user and to identify to the user tiles that are relevant to the search term.
- The processing means may be configured to: provide group-by options to the user to enable the user to request that tiles be rendered in groups according to user-selected classification values.
- The first classification or the second classification or both may be selected based on a profile of the user or a user input.

A second further example provides a method for determining tiles of interest to a user, the method comprising: rendering on a display a first plurality of tiles each having a respective value of a first classification; receiving from a user input receiving means a first user input indicating user interest in a first tile of the first plurality of tiles; the first tile having a first value of the first classification; and in response to receiving the first user input, rendering on the display a second plurality of tiles each having a respective value of a second classification and being related to the first tile by having a value of the first classification within a threshold similarity of the first value.

A third further example provides a means for determining tiles of interest to a user, the means providing: a display; a user input receiving means; and a processing means configured to: render on the display a first plurality of tiles each having a respective value of a first classification; receive from the user input receiving means a first user input indicating user interest in a first tile of the first plurality of tiles, the first tile having a first value of the first classification; and in response to receiving the first user input, render on the display a second plurality of tiles each having a respective value of a second classification and being related to the first tile by having a value of the first classification within a threshold similarity of the first value.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A computing device for determining tiles of interest to a user, the computing device comprising:
a display;
a user input receiving means; and
a processing means configured to:
render on the display a first plurality of tiles each having a respective value of a first classification;
receive from the user input receiving means a first user input indicating user interest in a first tile of the first plurality of tiles, the first tile having a first value of the first classification, and a further value of a further classification;
in response to receiving the first user input, render on the display a second plurality of tiles each having a respective value of a second classification and being related to the first tile by having a value of the first classification within a threshold similarity of the first value;

in response to reaching a limit of the second plurality of tiles, using the further classification by rendering on the display a further plurality of tiles each having a respective value of a yet further classification and being related to the first tile by having a value of the further classification within a threshold similarity of the further value, wherein the limit comprises a condition that all available tiles that are related to the first tile by having the value of the first classification within the threshold similarity of the first value have been rendered; and
enable scrolling of the rendered first plurality of tiles and the rendered second plurality of tiles at a same time in any direction with a plane of the display.

2. The computing device of claim 1, wherein the processing means is configured to:
receive from the user input receiving means a second user input indicating user interest in a second tile of the second plurality of tiles, the second tile having a second value of the second classification; and
in response to receiving the second user input, render on the display a third plurality of tiles each having a respective value of a third classification, being related to the first tile by having a value of the first classification within a threshold similarity of the first value, and being related to the second tile by having a value of the second classification within a threshold similarity of the second value.

3. The computing device of claim 2, wherein the processing means is configured to render the third plurality of tiles alongside the first plurality of tiles and the second plurality of tiles.

4. The computing device of claim 1, wherein the first tile has a further value of a further classification and the processing means is configured to:
determine the user has scrolled to an end of the rendered first plurality of tiles and the rendered second plurality of tiles; and
based on the determining, use the further classification to render on the display a further plurality of tiles each having a respective value of a yet further classification and being related to the first tile by having a value of the further classification within a threshold similarity of the further value.

5. The computing device of claim 1,
wherein the first tile has a further value of a further classification and the processing means is configured to use the further classification by rendering on the display a further plurality of tiles each having a respective value of a yet further classification and being related to the first tile by having a value of the further classification within a threshold similarity of the further value in response to determining a lack of user interest in the second plurality of tiles.

6. The computing device of claim 1, wherein the first classification and the second classification are selected based on a profile of the user or a user input.

7. The computing device of claim 1, wherein the processing means is configured to cause a search to be performed for tiles having the first value of the first classification.

8. The computing device of claim 1, wherein the first user input comprises scrolling towards a tile of interest.

9. The computing device of claim 1, wherein the first user input comprises selecting a tile of interest.

10. The computing device of claim 1, wherein the processing means is configured to render the second plurality of tiles alongside the first plurality of tiles.

11. The computing device of claim 1, wherein the processing means is configured to arrange the tiles in positions based on classification values of the tiles.

12. The computing device of claim 11, wherein the processing means is configured to group together tiles having values of a classification within a threshold similarity of each other.

13. The computing device of claim 12, wherein the processing means is configured to render a visual indicator that tiles are grouped together.

14. The computing device of claim 11, wherein the processing means is configured to group together tiles having respective values of respective classifications within a threshold similarity of each other.

15. The computing device of claim 1, wherein the processing means is configured to provide infinite scrolling through the rendered tiles.

16. The computing device of claim 1, wherein the processing means is configured to provide a search field for receiving a search term inputted by the user and to identify to user tiles that are relevant to the search term.

17. The computing device of claim 1, wherein the processing means is configured to provide group-by options to the user to enable the user to request that tiles be rendered in groups according to user-selected classification values.

18. The computing device of claim 1, wherein the first classification is selected based on a profile of the user or a user input.

19. A method for determining tiles of interest to a user, the method comprising:
  rendering on a display a first plurality of tiles each having a respective value of a first classification;
  receiving from a user input receiving means a first user input indicating user interest in a first tile of the first plurality of tiles, the first tile having a first value of the first classification, and a further value of a further classification;
  in response to receiving the first user input, rendering on the display a second plurality of tiles each having a respective value of a second classification and being related to the first tile by having a value of the first classification within a threshold similarity of the first value;
  in response to reaching a limit of the second plurality of tiles, using the further classification by rendering on the display a further plurality of tiles each having a respective value of a yet further classification and being related to the first tile by having a value of the further classification within a threshold similarity of the further value, wherein the limit comprises a condition that all available tiles that are related to the first tile by having the value of the first classification within the threshold similarity of the first value have been rendered; and
  enabling scrolling of the rendered first plurality of tiles and the rendered second plurality of tiles at a same time in any direction with a plane of the display.

20. A system for determining tiles of interest to a user, the system providing:
  a display;
  a user input receiving means; and
  a processing means configured to:
    render on the display a first plurality of tiles each having a respective value of a first classification;
    receive from the user input receiving means a first user input indicating user interest in a first tile of the first plurality of tiles, the first tile having a first value of the first classification, and a further value of a further classification;
    in response to receiving the first user input, render on the display a second plurality of tiles each having a respective value of a second classification and being related to the first tile by having a value of the first classification within a threshold similarity of the first value;
    in response to reaching a limit of the second plurality of tiles, using the further classification by rendering on the display a further plurality of tiles each having a respective value of a yet further classification and being related to the first tile by having a value of the further classification within a threshold similarity of the further value, wherein the limit comprises a condition that all available tiles that are related to the first tile by having the value of the first classification within the threshold similarity of the first value have been rendered; and
    enable scrolling of the rendered first plurality of tiles and the rendered second plurality of tiles at a same time in any direction with a plane of the display.

* * * * *